US009386156B2

(12) United States Patent
Hymel et al.

(10) Patent No.: US 9,386,156 B2
(45) Date of Patent: *Jul. 5, 2016

(54) METHODS AND APPARATUS TO AUDIBLY PROVIDE MESSAGES IN A MOBILE DEVICE

(71) Applicant: BlackBerry Limited, Waterloo (CA)

(72) Inventors: James Allen Hymel, Kitchener (CA); Jeffery Erhard Lindner, Mississauga (CA)

(73) Assignee: BlackBerry Limited, Waterloo (CA)

( * ) Notice: Subject to any disclaimer, the term of this patent is extended or adjusted under 35 U.S.C. 154(b) by 233 days.

This patent is subject to a terminal disclaimer.

(21) Appl. No.: 14/149,748

(22) Filed: Jan. 7, 2014

(65) Prior Publication Data
US 2014/0120884 A1 May 1, 2014

Related U.S. Application Data

(63) Continuation of application No. 12/901,401, filed on Oct. 8, 2010, now Pat. No. 8,655,661.

(51) Int. Cl.
*H04M 3/533* (2006.01)
*H04M 3/436* (2006.01)
*G06F 17/27* (2006.01)
*H04W 4/12* (2009.01)

(52) U.S. Cl.
CPC ....... *H04M 3/53333* (2013.01); *G06F 17/2765* (2013.01); *H04M 3/4365* (2013.01); *H04M 3/5335* (2013.01); *H04W 4/12* (2013.01); *H04M 2203/2011* (2013.01); *H04M 2203/6072* (2013.01); *H04M 2250/74* (2013.01)

(58) Field of Classification Search
CPC .................................................... H04M 3/5335
USPC .......................................................... 704/260
See application file for complete search history.

(56) References Cited

U.S. PATENT DOCUMENTS

| 5,812,648 | A | 9/1998 | Wanner |
| 5,924,068 | A | 7/1999 | Richard et al. |
| 6,449,343 | B1 | 9/2002 | Henderson |
| 7,024,183 | B2 | 4/2006 | Hymel |
| 7,158,499 | B2 | 1/2007 | Anderson et al. |

(Continued)

FOREIGN PATENT DOCUMENTS

| EP | 1571809 | 9/2005 |
| WO | WO03026261 | 3/2003 |
| WO | WO2007100553 | 9/2007 |

OTHER PUBLICATIONS

ATTdroids, Auto Ring-App to Bypass Vibrate/Silent Mode for Whitelisted Contacts-Review, Last Modified Aug. 11, 2010, Retrieved From [URL: http://www.attdroids.com/forum/android-apps/1440-auto-ring-app-bypass-vibrate-silent-mode-white-isted-contacts-review.html] on Aug. 11, 2010, 6 Pages.

(Continued)

*Primary Examiner* — Susan McFadden
(74) *Attorney, Agent, or Firm* — Fish & Richardson P.C.

(57) ABSTRACT

Methods and apparatus to audibly provide messages in a mobile device at described. An example method includes determining that audio of a voicemail includes a predetermined phrase and, in response to determining that the audio includes the predetermined phrase, audibly presenting the voicemail while the electronic device is set to at least one of a silent mode, a quiet mode, and a lock mode.

18 Claims, 5 Drawing Sheets

(56) References Cited

U.S. PATENT DOCUMENTS

| | | |
|---|---|---|
| 7,243,070 B2 | 7/2007 | Hoffmann et al. |
| 7,330,731 B2 | 2/2008 | Hymel |
| 7,643,822 B2 | 1/2010 | Ling et al. |
| 7,693,720 B2 | 4/2010 | Kennewick et al. |
| 8,655,661 B2 * | 2/2014 | Hymel ............... H04M 3/5335 704/260 |
| 9,100,809 B2 * | 8/2015 | Olincy .................. H04W 4/16 |
| 2005/0143134 A1 | 6/2005 | Harwood et al. |
| 2006/0063563 A1 | 3/2006 | Kaufman |

OTHER PUBLICATIONS

Ed Hardy, Diskagent Mobile Can Remotely Disable or Wipe a Stolen Phone, Published Mar. 13, 2009, Retrieved From [URL: http://www.brighthand.com/default.asp?newsID=15021&news=DiskAgent+Mobile+Phone+Security] on Aug. 11, 2010, 4 Pages.

Appscout, Drive Safe.ly Reads Messages Aloud and Auto-Responds for You, Oct. 9, 2009, Retrieved From [URL: http://www.appscout.com/2009/10/drivesafely_reads_messages_alo.php] on Aug. 11, 2010, 4 Pages.

Flexispy Ltd., Flexispy-Compare Spyphone Features, Copyright 2006, Retrieved From [URL:http://www.flexispy.com/spyphone-features-compare.htm] on Aug. 11, 2010, 3 Pages.

How to Locate a Misplaced Cell Phone on Vibrate in the House, Original Post May 27, 2010, Retrieved From [URL: http://nz.answers.yahoo.com/question/index?qid=20100526191017AAdh5Hp] on Aug. 11, 2010, 1 Page.

Lookout Inc., Missing Device, Published 2010, Retrieved From [URL: https://www.mylookout.com/features/missingdevice] on Aug. 11, 2010, 1 Page.

Neocall, Spyphone, Cryptophone Software; Neocall: How It Works, Aug. 11, 2010 Retrieved From [URL: http://www.neo-call.com/en/how_it_works.php] on Aug. 11, 2010, 2 Pages.

Lee Soft, Phone Finder 2.0, Copyright 2010 by Pocketgear, Retrieved From [URL: http://www.pocketgear.com/en/usd/2806601,product-details.html?M2DP . . . ] on Aug. 11, 2010, 3 Pagees.

Why Not, User:LPLPLPLP, Turn Off Cell Phone Remotely, Mar. 17, 2007, Retrieved From [URL: http://www.whynot.net/ideas/3546] on Aug. 11, 2010, 3 Pages.

Allbusiness.com Inc., DIAL2DO's Voice Activated Handsfree Assistant Selected As Launch Application for New Jawbone, Copyright1999-2010, Publication: Businesswire Jan. 21, 2010, Retrieved From [URL: http://www.allbusiness.com/technology/software-services-applications/13763286-1.html] on Oct. 8, 2010, 4 Pages.

Business Wire, DIAL2DO Expands Voice Activated Messaging Solution for Distracted Driving;Launches Mobile Application on Android Enabling Hands-Free, Two-Way Text Messaging by Voice, Feb. 15, 2010, Retrieved Fron [URL: http://findarticles.com/p/articles/mi_m0EIN/is_20100215/ai_n49514417/] on Oct. 8, 2010, 2 Pages.

DIAL2DO Copyright 2008-2010, Handsfree Assistant, Retrieved From [URL: http://www.dial2do.com/} on Oct. 8, 2010, 1 Page.

Copyright Vlingo, Inc. 2010, Voice to Text Applications Powered by Intelligent Voice Recognition, Retrieved From [URL: http://www.vlingo.com/] on Oct. 8, 2010, 2 Pages.

Financial Destination Inc. Copyright 2003-2010, Your New Voice-Activated Virtual Assistant, 2010, Retrieved From [URL: http://www.fdivoice.com/VOICE.CFM] on Oct. 8, 2010, 3 Pages.

Fran Briggs, FDIvoice Introduces Hands-Free, Voice Activated Telecom Service; Last Modified Jan. 16, 2010, Retrieved From [URL: http://www.ideamarketers.com/LIBRARY/PRINTARTICLE.CFM?ARTICLEID=889156] on Oct. 8, 2010, 2 Pages.

Financial Destination, Inc. Copyright 2003-2010, Citizens Against Distracted Driving (CADD) Announces Upcoming Launch on Aug. 27, 2010, Retrieved From [URL: http://www.fdivoice.com/NEWS.CFM] on Oct. 8, 2010, 3 Pages.

Financial Destination, Inc., Copyright 2003-2010, FDI Voice: Email by Phone, Retrieved From [URL: http://www.fdivoice.com/VOICE_FEATURES_EMAIL.CFM] on Oct. 8, 2010, 2 Pages.

European Patent Office, "Extended European Search Report," issued in connection with EP application No. 10186946.9, on Apr. 6, 2011 (7 pages).

Canadian Intellectual Property Office, "Office Action," issued in connection with application No. CA 2,752,410, on Jun. 4, 2013 (2 pages).

European Patent Office, "Communication pursuant to Article 94(3) EPC," issued in connection with corresponding application No. EP 10186946.9, on Oct. 29, 2013, 5 pages.

United States Patent and Trademark Office, "Non-Final Office Action," issued in connection with U.S. Appl. No. 12/901,401, on Oct. 23, 2012, 15 pages.

United States Patent and Trademark Office, "Notice of Allowance," issued in connection with U.S. Appl. No. 12/901,401, on Mar. 11, 2013, 13 pages.

United States Patent and Trademark Office, "Notice of Allowance," issued in connection with U.S. Appl. No. 12/901,401, on Oct. 8, 2013, 20 pages.

Canadian Intellectual Property Office, "Notice of Allowance," issued in connection with application No. CA 2,752,410, on Apr. 29, 2014, 1 page.

* cited by examiner

METHODS AND APPARATUS TO AUDIBLY PROVIDE MESSAGES IN A MOBILE DEVICE

RELATED APPLICATIONS

This patent is a continuation of U.S. patent application Ser. No. 12/901,401, filed on Oct. 8, 2010, which is hereby incorporated herein by reference in its entirety.

BACKGROUND

Users of mobile devices are not always able to read or listen to messages received at the mobile devices. For example, when a user is driving a vehicle, it may not be safe to read a message or request presentation of messages (e.g., play voicemails). At other times, users of mobile devices may set the mobile device to a silent or quiet mode of operation to prevent message alerts and phone ringing from distracting the user or interrupting others (e.g., in a meeting, on public transportation, etc.).

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which.

DETAILED DESCRIPTION

Figure 1:
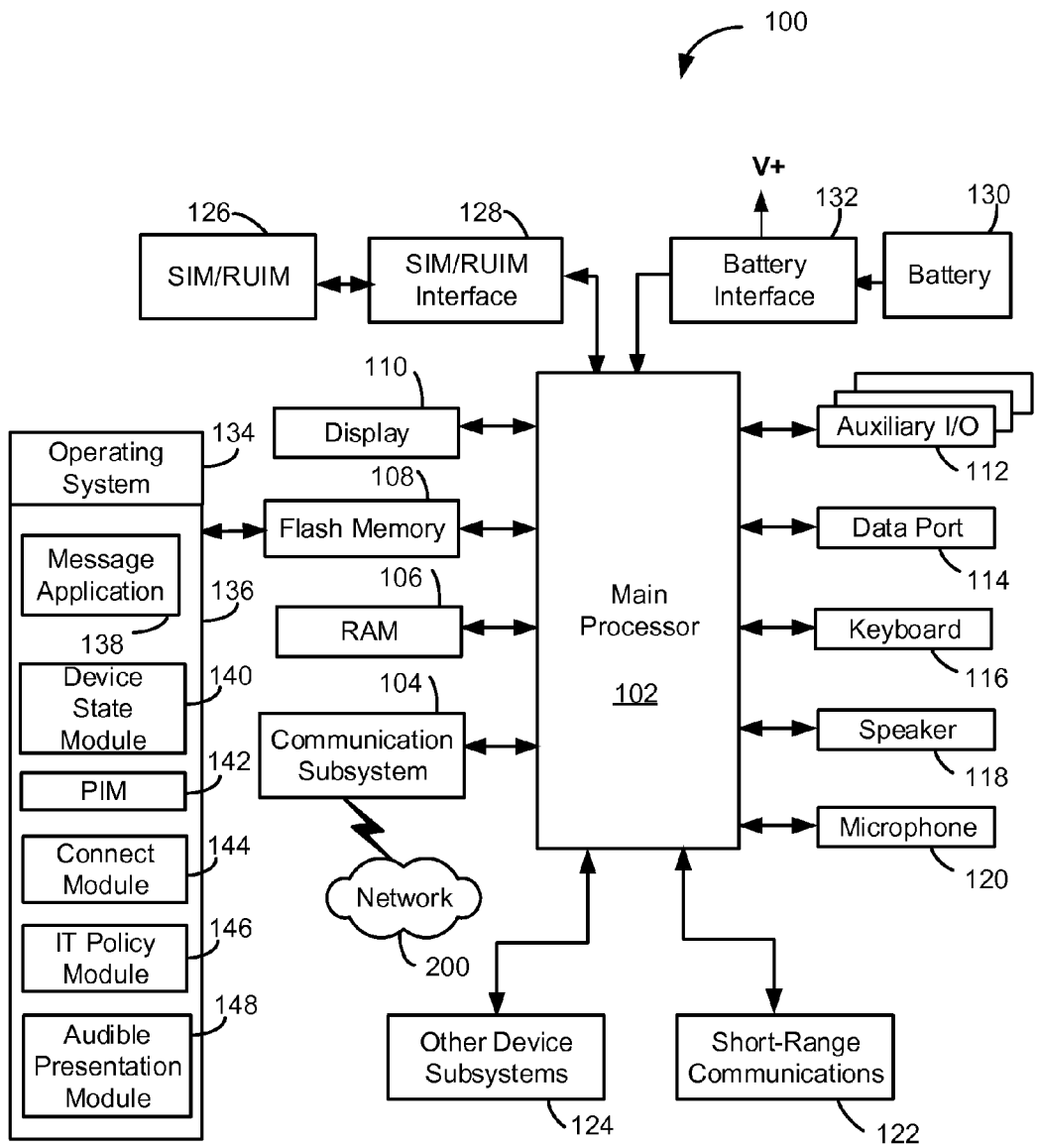
FIG. 1 is a block diagram of an example implementation of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, the implementations described herein may be practiced without these specific details. In other instances, well-known methods, procedures and components have not been described in detail so as not to obscure the implementations described herein. Also, the description is not to be considered as limiting the scope of the implementations described herein.

Some implementations described herein generally relate to a mobile device (e.g., a mobile wireless communication device), hereafter referred to as a mobile device, which includes an audible presentation module to automatically audibly present received messages based on the contents of the messages. Some implementations described herein allow a user that is not holding their phone to their ear (e.g., while driving) and/or has set their phone to a silent, quiet, or private operating mode to be alerted of and/or hear messages received at the mobile device. For example, a user of a mobile device may provide a predetermined phrase (e.g., a challenge phrase) to a particular person or persons (e.g., a spouse). The predetermined phrase may be set at any time by the user, may be changed at any time, and may be dynamically determined (e.g., based on the day of the week, the date, the time of day, the person sending a message, etc.). When the person sends a message to the user, the person can include the challenge phrase in the contents of the message (e.g., by speaking the challenge phrase while leaving a voicemail, including the challenge phrase in the contents (e.g., body, subject, header, etc.) of a text based message, etc.). When the mobile device receives the message, the audible presentation module analyzes the message for the presence of the challenge phrase. When the challenge phrase is identified, the message is played to the user in a loud speaker or speakerphone mode of the mobile device. Accordingly, while the user is not distracted by all messages received by the mobile device, the user can still be alerted of and/or hear messages that include the challenge phrase.

Many usage scenarios of example implementations described herein are possible. For example, a person may call the user of a mobile device and the user may not answer (e.g., the user is driving and cannot pick up their phone due to safety and/or lawful reasons, the user's phone is set to silent or quiet operation, etc.). Having not received a response, the person may send an email including the challenge phrase, which will be audibly presented to the user of the mobile device despite the silent setting of the mobile device. In another example scenario, a user may be in a place where they cannot be interrupted by a mobile device (e.g., a meeting, a movie, etc.) and may set their phone to a silent setting. However, the user of the mobile device may wish to empower another person to have the ability to override this setting in the case of an emergency. Accordingly, when the person calls the user and gets a voicemail system, the person may provide the challenge phrase which will be passed to the audible presentation module of the mobile device to provide an alert and/or present the message audibly.

The audible presentation module of the mobile device may also include security and privacy features. For example, the audible presentation module may require that the user of the mobile device speak or otherwise provide a password or challenge phrase before the message is audibly presented.

The example mobile device may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Referring first to FIG. 1, shown therein is a block diagram of an example implementation of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the implementations described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network, and device-resident functions such as a calculator or task list.

The mobile device 100 can send and receive communication signals over the wireless network after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some implementations, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 148 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 148, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some implementations, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 108 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some implementations, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

The mobile device 100 also includes an audible presentation module 148 to trigger audible presentation of message information by the mobile device 100 based on the contents of messages received at the mobile device 100. Messages received at the mobile device 100 may be electronic mail (email) messages, SMS messages, MMS messages, any other type of text messages, voicemail messages, etc. The audible presentation module 148 analyzes, parses, or otherwise processes an incoming message received via the message application 138 or any other module of the mobile device 100 to determine if the message includes information for triggering audible presentation of the message by the mobile device 100. The information for triggering audible presentation may be one or more predetermined words or phrases, message characteristics (e.g., a message urgency label, a message flag, a message category, etc.), and so forth. When the information for triggering audible presentation is detected, the audible presentation module 148 causes the message to be presented via the speaker 118. The message may be presented at a volume that enables the message to be heard without a user holding the phone to their ear. In association with the audible presentation, the audible presentation module 148 may receive instructions from a user of the mobile device 100 via the microphone 120. For example, the audible presentation module 148 may present a message via the speaker 118 requesting that the user speak a password or challenge word or phrase and may receive the user's vocal input via the microphone 120.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. The message may also be processed by the audible presentation module 148 to determine if audible presentation of the message should be triggered. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, an optical navigation control or trackpad, or a roller wheel with dynamic button pressing capability. The keyboard 116 is preferably an alphanumeric keyboard and/or telephone-type keypad. However, other types of keyboards may also be used. A composed item may be transmitted over the wireless network through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
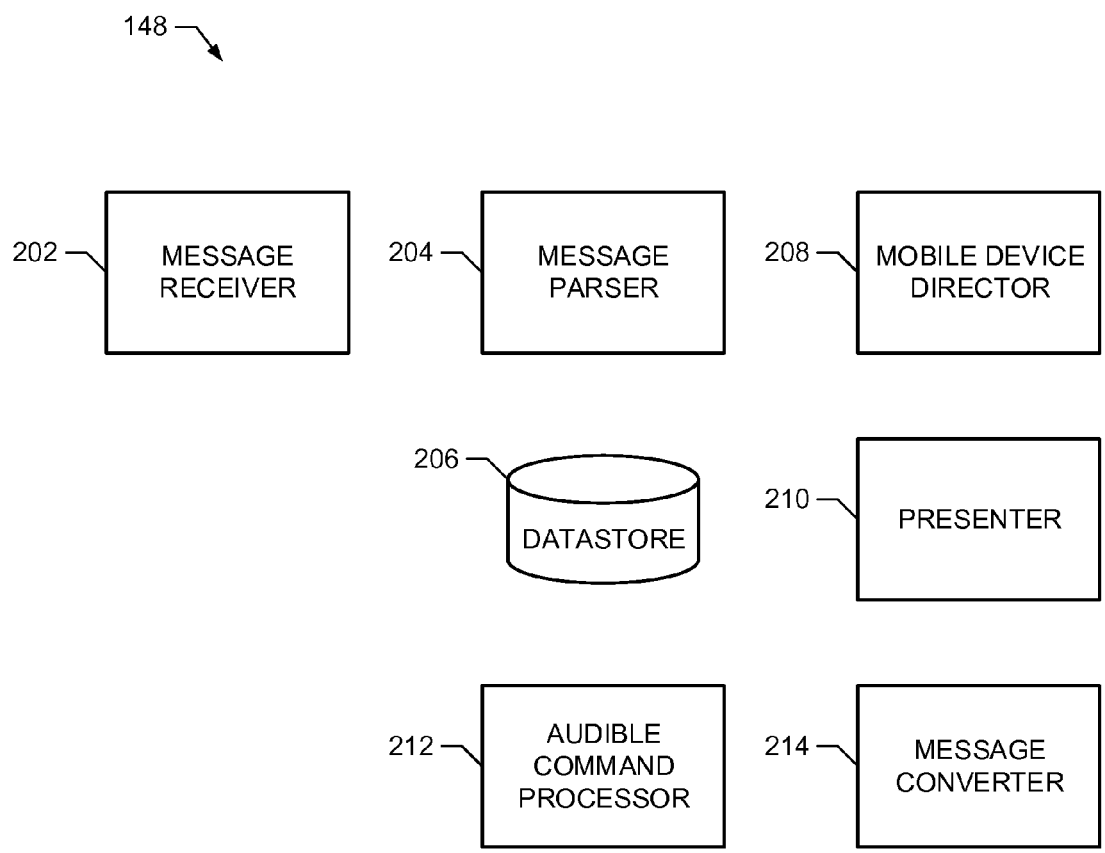
FIG. 2 is a block diagram of an example implementation of the audible presentation module of FIG. 1.

FIG. 2 illustrates a block diagram of an example implementation of the audible message presenter 148. The audible message presenter 148 of the illustrated example includes a message receiver 202, a message parser 204, a datastore 206, a mobile device director 208, a presenter 210, an audible command processor 212, and a message converter 214.

The message receiver 202 of the example message presenter 148 receives messages at the mobile device 100. For example, the message receiver 202 may receive messages from the message application 138 of FIG. 1, from another module of the mobile device 100, and/or directly from a network. For example, the message receiver 202 may receive emails, SMS messages, MMS messages, voicemails, etc. The example message receiver 202 receives entire messages. Alternatively, the message receiver 202 may receive parts of messages such as, for example, one or more headers of messages, bodies of messages, characteristics of messages, etc. Likewise, while the message receiver 202 receives all messages received by the mobile device 100, the message receiver 202 may receive a subset of messages.

The message receiver 202 provides the received messages to the message parser 204 for processing and the message converter 214 (e.g., when message conversion is to be performed).

The message parser 204 receives messages from the message receiver 202 and parses the messages to determine if the messages indicate that audible presentation of the messages should be performed. The message parser 204 of the illustrated example parses a received message to determine if the message includes a challenge phrase that indicates that audible presentation of the message should be triggered. For example, the body, the identification of the sender, the identification of the recipient, and/or the subject of a text-based message (e.g., an email, SMS message, MMS message, etc.) could include the challenge phrase (e.g., the text "Challenge phrase: Password"). In an audible message, the challenge phrase could be included in the message (e.g., spoken "The challenge phrase is Password"), could be entered on a telephone keypad (e.g., a numerical password), could be spoken or entered on a keypad in response to interactive voice response (IVR) system prompt, etc. Alternatively, any other portion of a message, characteristic of a message, or combination thereof may indicate that audible presentation of the message should be triggered. In addition, the message parser 204 may parse the messages for multiple indications that audible presentation of a message should be triggered. For example, a first indication may apply to a first recipient and a second indication may apply to a second recipient. In other words, if a message is received with an identification that indicates that the message is from sender 1, the challenge phrase could be "Password1" and if a message is received with an identification that indictes that the message is from sender 2, the challenge phrase could be "Password2." The message parser 204 of the illustrated example stores the indications (e.g., as rules) in the datastore 206. The message parser 204 can provide a user interface (e.g., graphical, IVR, etc.) to enable the user to configure the indications.

If the message parser 204 determines that audible presentation of a message should be triggered, the message parser 204 notifies one or more of the mobile device director 208, the presenter 210, and the message converter 214.

While the example message parser 204 processes all messages received at the mobile device 100, the message parser 204 may alternatively include rules indicating when messages should be processed. For example, the message parser 204 may only process messages during certain hours (e.g., 8:00 AM until 10:00 PM). The message parser 204 may examine an appointment book or calendar associated with the mobile device 100 to determine when audible presentation of messages is appropriate. For example, the message parser 204 may determine that messages should not be audibly presented during meetings or other situations in which privacy is needed or interruption is unwanted or, alternatively, should be presented during meetings or other situations in which privacy is needed or interruption is unwanted (e.g., when the messages relate to emergencies and it is presumed that the user of the mobile device 100 is not answering but could if the user left the meeting or other situation). The example message parser 204 could also examine a setting of the mobile device 100 to determine when audible presentation is desired. For example, a software setting or physical switch or other control could toggle audible presentation mode on or off. Alternatively, audible presentation could be enabled based on other settings of the mobile device (e.g., audible presentation could be enabled whenever the mobile device is in silent mode, whenever the mobile device is in quiet mode, whenever the mobile device is in loud mode, etc.).

The datastore 206 of the illustrated example is a configuration file that stores one or more indications (e.g., rules) for determining if audible presentation of a message should be triggered. The datastore 206 also stores one or more challenge phrases that a user of the mobile device 100 must provide before audible presentation of a message will be triggered. Additionally, the example datastore 206 stores a list of commands and corresponding actions that may be received by the audible command processor 212. In some other implementations, the datastore 206 may store any subset and any number of the indications, challenge phrases, and commands. The datastore 206 of the illustrated example may be implemented by any data structure such as, for example, a database, a flat file, an extensible markup language (XML) file and any type of data storage such as, for example, flash memory, RAM, ROM, SIM/RUIM, etc.

The mobile device director 208 of the illustrated example instructs or controls the operation of other components of the mobile device 100 on behalf of the audible presentation module 148. The example mobile device director 208 enables the microphone 120 of the mobile device 100 when the audible presentation module 148 needs to obtain audible user input from the user of the mobile device 100. The example mobile device director 208 enables the speaker 118 for audio output when the audible presentation module 148 is to present audible information to or request information from the user of the mobile device. For example, the mobile device director 208 may instruct the mobile device 100 to transition from a "silent" mode to a "loud speaker" mode. The example mobile device director 208 may enable or instruct any other component or element of the mobile device 100. The example mobile device director 208 similarly disables the microphone 120, the speaker 118, or any other component or element of the mobile device 100. The mobile device 100 and the components thereof may be controlled at the software level (e.g., using application program interfaces (APIs), exposed functions, etc.) and/or at the hardware level.

The presenter 210 of the illustrated example audibly presents messages when triggered by the message parser 204. When the messages are audio messages (e.g., voicemail messages), the presenter 210 plays the audio of the message over the speaker 118 after the mobile device director 208 has caused the speaker 118 to be enabled. When the messages are not audio messages, the presenter 210 receives the messages from the message converter 214, which converts the messages to audio (e.g., by converting text to speech). The presenter 210, the message converter 214, and/or the message parser 204 may remove a challenge phrase or other indication from the message prior to audibly presenting the message. The presenter 210 of the illustrated example is also responsible for presenting prompts to the user of the mobile device 100. For example, the presenter 210 instructs the user when to speak a challenge phrase, when to speak voice commands, etc. The presenter 210 may present any other information to users such as, for example, an indication that a message was received, an indication that a received message did not include information indicating that it should be audibly presented, an indication that a received message included information indicating that it should be audibly presented, etc. The example presenter 210 provides information and prompts using spoken words (e.g., prerecorded speech, computer generated speech, audible messages, converted messages). Alternatively, the example presenter 210 could use any combination of spoken words, tones, sound effects, visual cues and information, etc.

The audible command processor 212 of the illustrated example processes commands provided by a user of the mobile device 100. For example, after the presenter 210 prompts a user to speak a challenge phrase, the audible command processor 212 receives any spoken words via the microphone 120. The audible command processor 212 processes the words to determine if they include the challenge phrase. According to the illustrated example, the audible command processor 212 converts the spoken words to text and compares the text against the challenge phrase(s) stored in the data store 206. Alternatively, the challenge phrase(s) could be stored in any other location.

The audible command processor 212 of the illustrated example also determines if a user has provided a command. For example, the user may speak a challenge phrase, followed by the command "unlock." The audible command processor 212 will confirm that the challenge phrase is correct and, then, in response to the command, instruct the mobile device 100 to move to an unlocked mode. Any other commands may be processed such as, for example, volume changes, ringer setting changes, audio setting changes, etc.

In addition to receiving commands from the user of the mobile device 100, the example audible command processor 212 also receives information for messages to be sent from the mobile device 100. For example, after a message has been presented by the presenter 210 and the presenter has prompted the user to provide a response, the audible command processor 212 receives the spoken words of the user via the microphone 120. The user can indicate that they would like to respond to the message and speak a message to be sent. The audible command processor 212 converts the spoken message to text, if needed, and causes a message including the spoken message to be sent to the sender of the original message. The audible command processor 212 may also receive additional recipients or a new recipient (e.g., when the message is forwarded to a new recipient rather than a reply sent to the original sender).

The example message converter 214 converts messages from one format to another. For example, the message converter 214 may handle all conversion of speech to text and text to speech for the audible presentation module 148. Alternatively, some or all conversion may be performed by other components of the audible presentation module 148. The message converter 214 may additionally perform other message conversion. For example, the message converter 214 may convert messages from one audio format to another or one text format to another. The message converter 214 provides converted messages to one or more of the message parser 204, the presenter 210, the audible command processor 212, or any other component.

While an example manner of implementing the audible presentation module 148 of FIG. 1 has been illustrated in FIG. 2, one or more of the elements, processes and/or devices illustrated in FIG. 2 may be combined, divided, re-arranged, omitted, eliminated and/or implemented in any other way. Further, the example message receiver 202, message parser 204, datastore 206, mobile device director 208, presenter 210, audible command processor 212, message converter 214 of FIG. 2 and/or, more generally, the example audible presentation module 148 of FIG. 1 may be implemented by hardware, software, firmware and/or any combination of hardware, software and/or firmware. Thus, for example, any of the example message receiver 202, message parser 204, datastore 206, mobile device director 208, presenter 210, audible command processor 212, message converter 214 and/or, more generally, the example audible presentation module 148 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example message receiver 202, message parser 204, datastore 206, mobile device director 208, presenter 210, audible command processor 212, message converter 214 and/or the example audible presentation module 148 are hereby expressly defined to include a computer readable medium such as a memory, DVD, CD, etc. storing the software and/or firmware. Further still, the example audible presentation module 148 of FIG. 1 may include one or more elements, processes and/or devices in addition to, or instead of, those illustrated in FIG. 2, and/or may include more than one of any or all of the illustrated elements, processes and devices.

Figure 3:
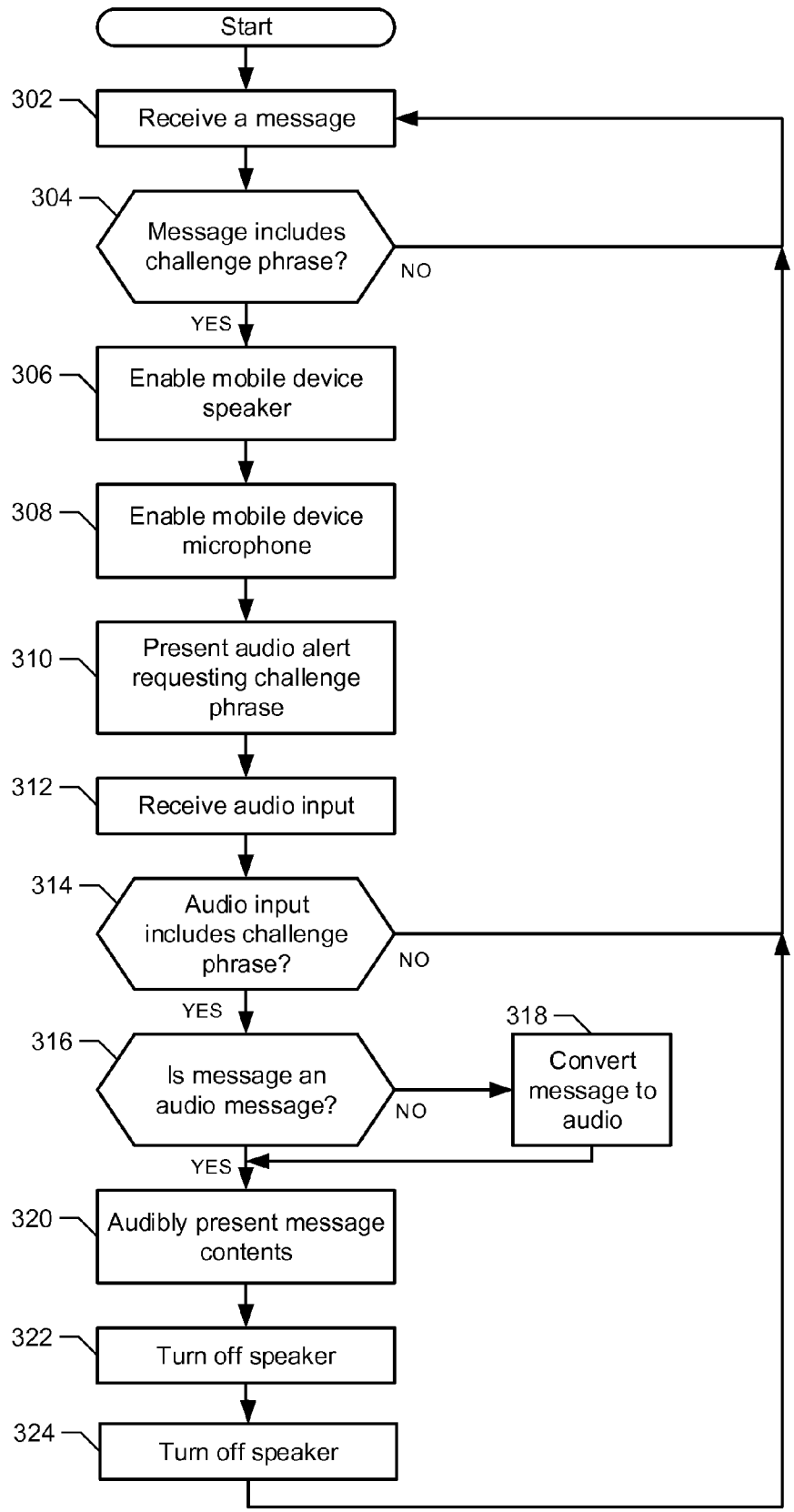
FIGS. 3-5 are flowcharts illustrating example processes to implement the audible presentation module of FIG.
Figure 4:
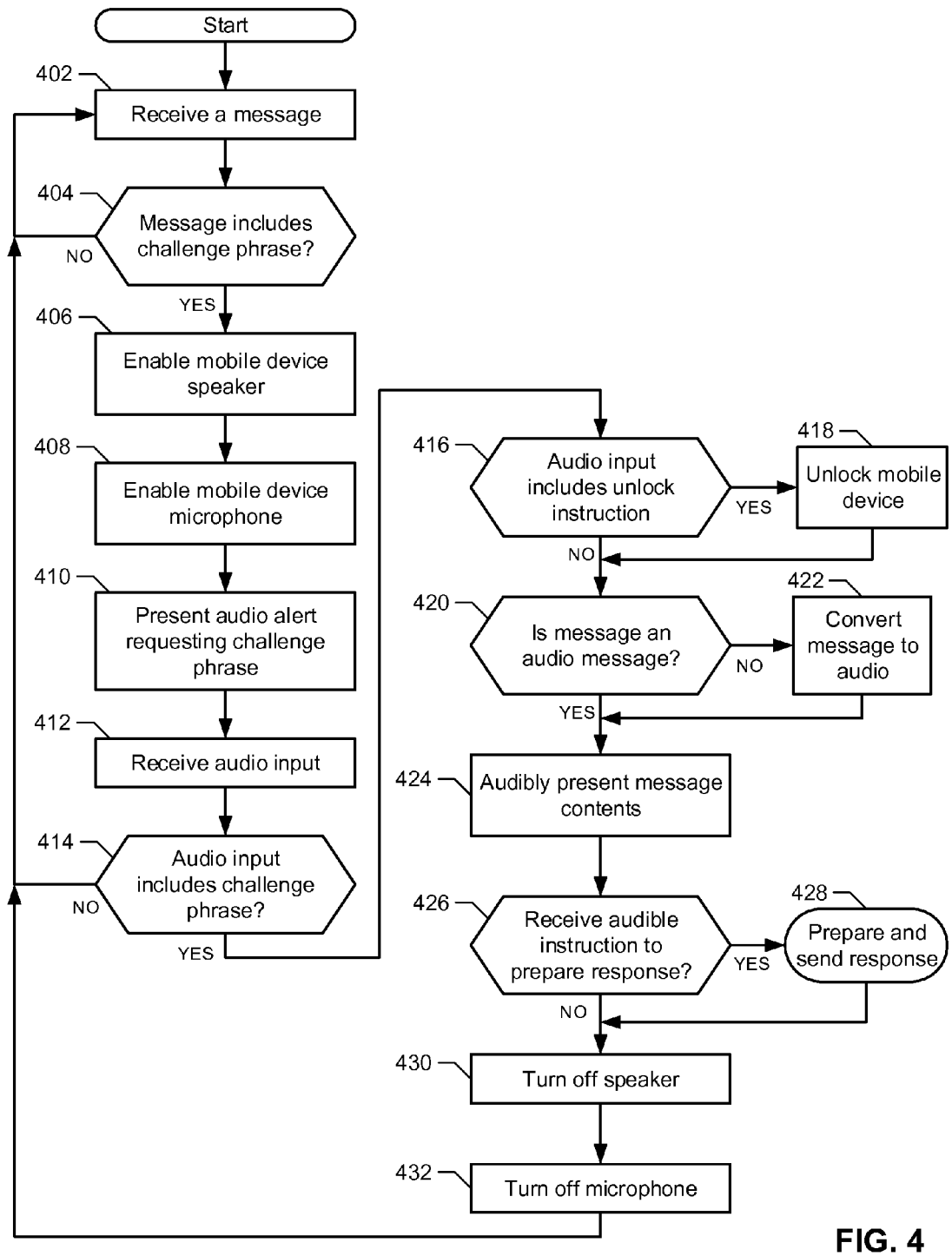
Figure 5:
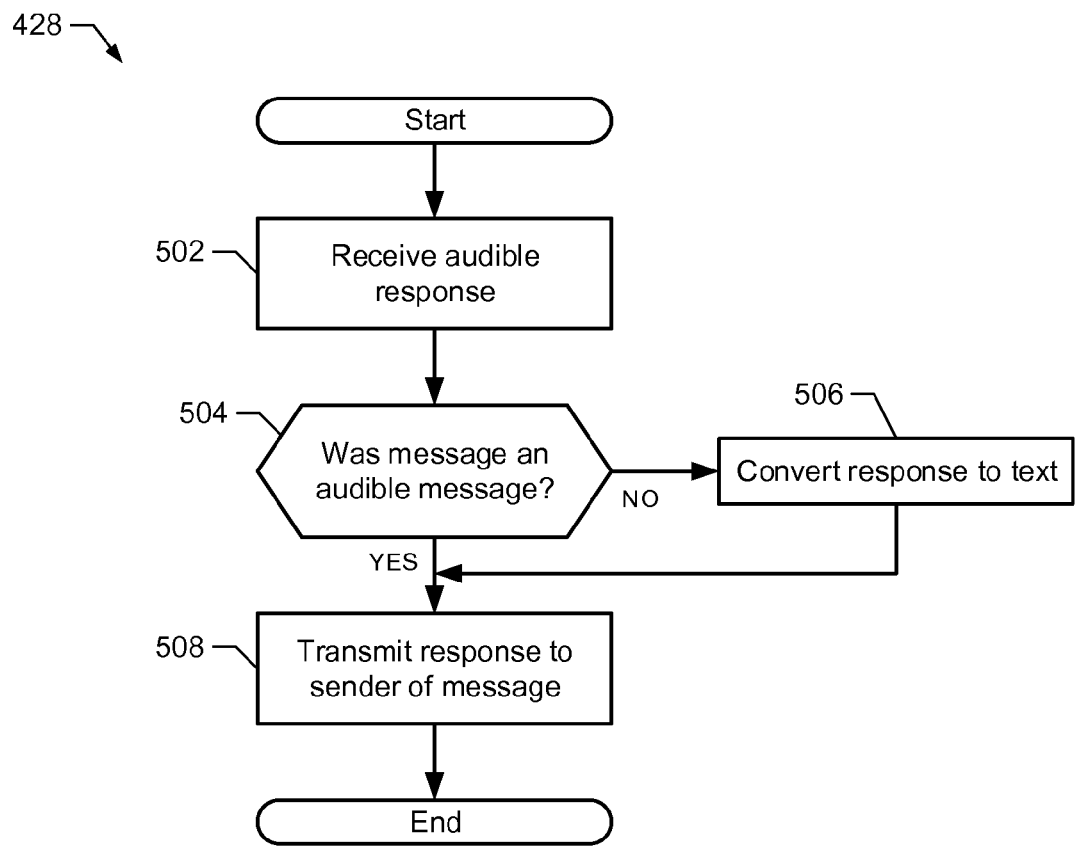

Flowcharts of example processes for implementing the audible presentation module 148 of FIG. 1 are shown in FIGS. 3-5. The example processes may be implemented by machine readable instructions comprising a program for execution by a processor such as the main processor 102 of FIG. 1. The machine readable instructions may be embodied in software stored on a computer readable medium such as a CD, a floppy disk, a hard drive, a DVD, Blu-ray disc, or a memory associated with the main processor 102, but the entire set of machine readable instructions and/or parts thereof could alternatively be executed by a device other than the main processor 102 and/or embodied in firmware or dedicated hardware. Further, although the example processes are described with reference to the flowchart illustrated in FIGS. 3-5, many other methods of implementing the example audible presentation module 148 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer readable instructions) stored on a tangible computer readable medium such as a hard disk drive, a flash memory, a ROM, a CD, a DVD, a Blu-ray disc, a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 3-5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The processes of FIGS. 3-5 are described in conjunction with the components of the audible presentation module 148 of FIG. 2 and the mobile device 100 of FIG. 1 by way of example. Alternatively, the processes of FIGS. 3-5 may be performed by any other devices, components, or systems.

FIG. 3 illustrates an example process to implement the audible presentation module 148. The example process of FIG. 3 begins when the message receiver 202 receives a message (block 302). For example, the message may be a text based message, a voicemail message, etc. The message parser 204 analyzes the message to determine if the message includes a valid challenge phrase (block 304). For example, the message parser 204 may compare a received challenge phrase with information stored in the datastore 206. When the message does not include a valid challenge phrase, control returns to block 302 to wait for the next message.

When the message includes a valid challenge phrase (block 304), the mobile device director 208 enables the speaker 118 of the mobile device 100 (block 306). For example, the mobile device directory 208 may instruct the operating system of the mobile device 100 to transition to a loud speaker mode. The mobile device director 208 then enables the microphone 120 (block 308). The presenter 210 then presents an audio alert requesting that the user of the mobile device 100 speak a challenge phrase (block 310). For example, the presenter may play an audio tone followed by a spoken message instructing the user to speak the challenge phrase. The challenge phrase may be the same challenge phrase as is included in the message or may be a different challenge phrase. The presenter 210 may additionally audibly present information about the received message such as, for example, the sender, the intended recipient, the subject line, etc. The audible command processor 212 receives audio input via the microphone 120 (block 312). The audible command processor 212 then determines if the audio input includes the challenge phrase (block 314). When the audio input does not include the challenge phrase, control returns to block 302. Alternatively, control may return to block 310 to give the user another opportunity to speak the challenge phrase.

When the audio input includes the challenge phrase (block 314), the presenter 210 determines if the message is an audio message (block 316). When the message is not an audio message, the message is converted to audio by the message converter 214 (block 318). For example, the message converter 214 may perform a text to speech conversion.

When the message is an audio message (block 316) or after the message has been converted to audio (block 318), the presenter 210 audibly presents the message via the speaker 118 (block 320). For example, the message may be played over the speaker 118 at a volume that enables the user of the mobile device 100 to hear the message without holding the mobile device 100 to their ear (e.g., in loud speaker or speakerphone mode).

According to the example process, the mobile device director 208 then disables the speaker 118 (block 322) and disables the microphone 120 (block 324). Control then returns to block 302 to wait for the next message. Alternatively, the speaker 118 and the microphone 120 may be enabled or disabled at any other times as appropriate.

FIG. 4 illustrates a second example process to implement the audible presentation module 148. Any examples and alternatives described in conjunction with FIG. 3 may be applied to the corresponding blocks of FIG. 4. The example process of FIG. 4 begins when the message receiver 202 receives a message (block 402). The message parser 204 analyzes the message to determine if the message includes a valid challenge phrase (block 404). When the message does not include a valid challenge phrase, control returns to block 402 to wait for the next message.

When the message includes a valid challenge phrase (block 404), the mobile device director 208 enables the speaker 118 of the mobile device 100 (block 406). The mobile device directory 208 then enables the microphone 120 (block 408). The presenter 210 then presents an audio alert requesting that the user of the mobile device 100 speak a challenge phrase (block 410). The audible command processor 212 receives audio input via the microphone 120 (block 412). The audible command processor 212 then determines if the audio input includes the challenge phrase (block 414). When the audio input does not include the challenge phrase, control returns to block 402. Alternatively, control may return to block 410 to give the user another opportunity to speak the challenge phrase.

When the audio input includes the challenge phrase (block 414), the audible command processor 212 determines if the audio input also includes an instruction to unlock the mobile device (block 416). For example, the user may speak a password and an instruction for unlocking a device. When the audio input includes the instruction to unlock the mobile device, the mobile device director 208 instructs the operating system of the mobile device 100 to unlock the mobile device 100 (block 418). Alternatively, a command other than an unlock command may be received and processed such as, for example, a volume control instruction, an audio setting instruction, an operation mode instruction, an instruction to dial a telephone number, an instruction to send a message, an instruction to delete a message, etc.

When the audio input does not include an instruction (block 416) or after the instruction has been processed (block 418), the presenter 210 determines if the message is an audio message (block 420). When the message is not an audio message, the message is converted to audio by the message converter 214 (block 422).

When the message is an audio message (block 420) or after the message has been converted to audio (block 422), the presenter 210 audibly presents the message via the speaker 118 (block 424). The audible command processor 212 then determines if additional instructions have previously been provided or are currently provided by the user of the mobile device 100 or in the message (block 426). For example, a user of the mobile device 100 may speak a command to respond to the message after hearing the message, may have spoken a command to respond to the message that was received at block 412, may speak a command to answer an incoming phone call that has been transferred to voicemail where a caller has entered the challenge phrase, etc. Additionally or alternatively, the message could have included an instruction in addition to the challenge phrase such as, for example, an instruction to send an automatic reply, an instruction to ask the user for a reply, and so forth. When the user has provided an additional instruction (according to the illustrated example, an instruction to respond to the message), the audible presentation module 148 prepares and sends a response (or performs any other processing in response to the instruction) according to the process of block 428, described in conjunction with FIG. 5.

When the user has not provided an additional instruction (block 426) or after processing the instruction (block 428), the mobile device director 208 then disables the speaker 118 (block 430) and disables the microphone 120 (block 432). Control then returns to block 402 to wait for the next message. Alternatively, the speaker 118 and the microphone 120 may be enabled or disabled at any other times as appropriate.

Turning to FIG. 5 and block 428, an example process to prepare and send a response to a message is illustrated. As described in conjunction with FIG. 4, the process of FIG. 5 may be performed after a user has indicated that they would like to send a response in block 426 or at any other time. The process of FIG. 5 begins when an audible response to a message is received by the audible command processor 212 (block 502). For example, the user may speak a message that is a reply to a message received in block 402 of the process of FIG. 4. The audible command processor 502 then determines if the message (e.g., the message received in block 402 of FIG. 4) was an audible message (block 504). According to the illustrated example, responses to messages are provided in the same format as the message. Alternatively, the format of a response may be different than the format of the message. For example, when a voicemail is received, the audible command processor 502 may determine an email address for the sender of the voicemail from the contact list available at the mobile device 100 and may send an email response.

According to the illustrated example, when the original message was not an audible message (block 504), the message converter 214 converts the message from audio to text (e.g., by performing a speech to text conversion) (block 506).

When the original message was an audible message (block 504) or after the message has been converted to text (block 506), the mobile device director 208 causes the mobile device 100 to send a response including the audible message received by the user in audio or text format (block 508). For example, the mobile device director 208 may utilize an API or other interface of the mobile device 100 to cause the message to be sent. For example, the mobile device director 208 may instruct the message application 138 to send the response. The process of FIG. 5 then ends. According to the example of FIG. 4, control then returns to block 430.

While the foregoing describes an example block diagram implementation of the audible presentation module 148 and processes to implement the audible presentation module 148, other implementations are possible. For example, additional blocks may be included and additional or different connections between the blocks may exist.

What is claimed is:

1. A method comprising:
   determining that audio of a voicemail includes a predetermined phrase; and
   in response to determining that the audio includes the predetermined phrase, audibly presenting the voicemail while the electronic device is set to at least one of a silent mode, a quiet mode, or a lock mode.

2. The method as defined in claim 1, further comprising:
   in response to determining that the audio includes the predetermined phrase, receiving a voice input at the electronic device; and
   determining that the voice input includes a second predetermined phrase, wherein audibly presenting the voicemail is performed in response to determining that the voice input includes the second predetermined phrase.

3. The method as defined in claim 2, wherein the predetermined phrase and the second predetermined phrase are the same.

4. The method as defined in claim 1, wherein the predetermined phrase is at least one word.

5. The method as defined in claim 1, further comprising removing the predetermined phrase from the voicemail before presenting the voicemail.

6. The method as defined in claim 1, further comprising determining a sender of the voicemail, wherein the predetermined phrase is associated with the sender of the voicemail.

7. An electronic device comprising:
   a message receiver for receiving a voicemail;
   a message parser to determine that audio of the voicemail includes a predetermined phrase; and
   a presenter to, in response to determining that the audio includes the predetermined phrase, audibly present the voicemail while the electronic device is set to at least one of a silent mode, a quiet mode, or a lock mode.

8. The electronic device as defined in claim 7, further comprising an audible command processor to:
   receive a voice input at the electronic device; and
   determine that the voice input includes a second predetermined phrase, wherein presenter is to audibly present the voicemail in response to the audible command processor determining that the voice input includes the second predetermined phrase.

9. The electronic device as defined in claim 8, wherein the predetermined phrase and the second predetermined phrase are the same.

10. The electronic device as defined in claim 7, wherein the predetermined phrase is at least one word.

11. The electronic device as defined in claim 7, wherein the message parser is to remove the predetermined phrase from the voicemail before presenting the voicemail.

12. The electronic device as defined in claim 7, wherein the message parser is to determine a sender of the voicemail, wherein the predetermined phrase is associated with the sender of the voicemail.

13. A non-transitory computer readable storage disc or storage device including instructions that, when executed, cause a machine to at least:
   determine that audio of a voicemail includes a predetermined phrase; and
   in response to determining that the audio includes the predetermined phrase, audibly present the voicemail while the electronic device is set to at least one of a silent mode, a quiet mode, or a lock mode.

14. The computer readable storage disc or storage device as defined in claim 13, wherein the instructions, when executed, cause the machine to:
- in response to determining that the audio includes the predetermined phrase, receive a voice input at the electronic device; and
- determine that the voice input includes a second predetermined phrase, wherein audibly presenting the voicemail is performed in response to determining that the voice input includes the second predetermined phrase.

15. The computer readable storage disc or storage device as defined in claim 14, wherein the predetermined phrase and the second predetermined phrase are the same.

16. The computer readable storage disc or storage device as defined in claim 13, wherein the predetermined phrase is at least one word.

17. The computer readable storage disc or storage device as defined in claim 13, wherein the instructions, when executed, cause the machine to remove the predetermined phrase from the voicemail before presenting the voicemail.

18. The computer readable storage disc or storage device as defined in claim 13, wherein the instructions, when executed, cause the machine to determine a sender of the voicemail, wherein the predetermined phrase is associated with the sender of the voicemail.

* * * * *